Sept. 24, 1963 P. FAVROT 3,105,164
ELECTRIC MOTORS OF ASYNCHRONOUS OR EDDY-CURRENT
Filed Feb. 6, 1961 2 Sheets-Sheet 2
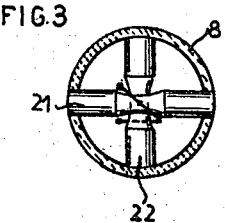
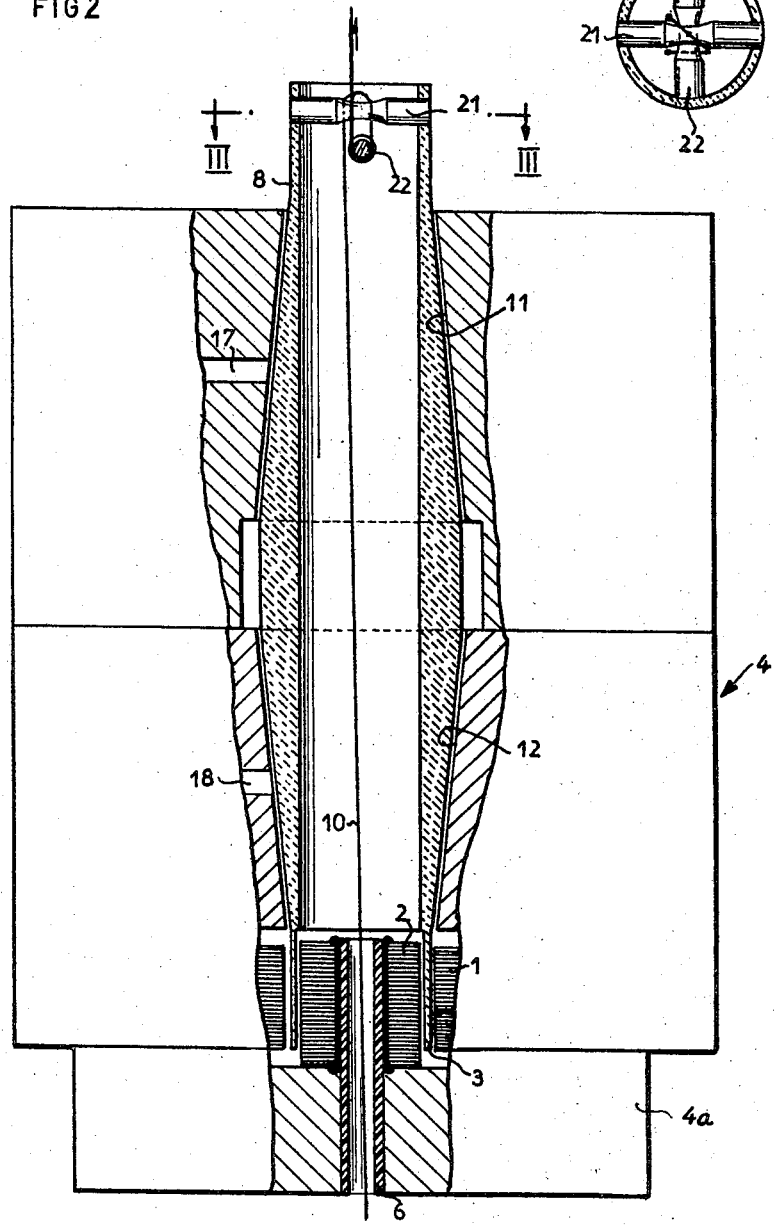

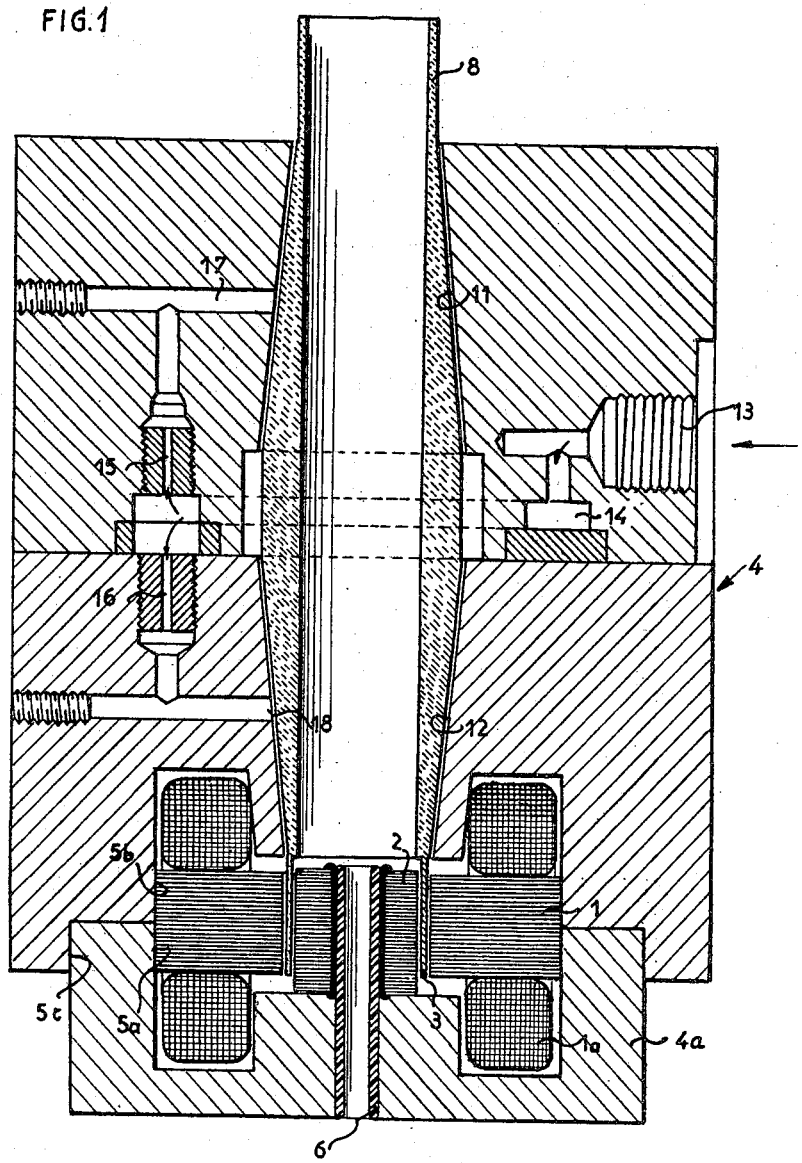

United States Patent Office 3,105,164
Patented Sept. 24, 1963

3,105,164
ELECTRIC MOTORS OF ASYNCHRONOUS OR EDDY-CURRENT
Paul Favrot, Lyon, France, assignor to Gendron Freres S.A., Villeurbanne, France, a company of France
Filed Feb. 6, 1961, Ser. No. 87,183
Claims priority, application France Feb. 12, 1960
4 Claims. (Cl. 310—266)

This invention relates to electric motors of the asynchronous or eddy-current type, and has as an important object to provide such a motor of simple construction which will be operable at very high rotational speeds.

In conventional asynchronous motors the rotor structure generally comprises a set of conductors imbedded in a body of magnetic metal and is rotatably mounted in a rotating magnetic field created by a surrounding stator structure. Any residual off-center or unbalance condition of the rotor results in a cyclic magnetic attraction force being exerted by the stator field on the magnetic part of the rotor, and at high rotor speeds this unbalancing magnetic force can assume large proportions with objectionable consequences to the rotor bearings. To avoid this conventional asynchronous motor rotors have to be very carefully centered and subjected to long and tedious dynamic balancing operations, but even then satisfactory performance at very high speeds remains difficult to achieve.

It is one object of the invention to provide an asynchronous motor in which this source of trouble is eliminated by the fact that the rotor structure is free of any magnetic material.

Another object, is to provide an asynchronous motor having an extremely lightweight, low-inertia rotor entirely made of non-magnetic material which will be capable of very high-speed rotation and will be easy to center and balance with respect to the cooperating stator structure.

Further objects are to provide such a motor in which the magnetic field is radially rather than axially directed; in which the rotor is mounted in self-centering air-bearings of improved construction; in which the rotor is simply and efficiently cooled by an air stream derived from the rotor-mounting air-bearings; and in which the lightweight rotor is formed as an integral extension of the output shaft of the motor.

A specific object is to provide a motor which will be highly suitable for operation at very high speeds under relatively low output torque conditions, and which will have very high acceleration characteristics so that it will assume its high final operating speed in a very short time. In relation with this object the invention contemplates as one especially important application thereof, the use of the improved asynchronous motor for the purposes of twisting yarn in the textile industries, and it is hence another object of the invention to provide improved yarn twisting apparatus incorporating the improved motor. Other objects will appear from the specification.

In an important aspect the invention provides a high-speed radial-field asynchronous motor comprising magnetic structure defining a generally cylindrical annular airgap, windings creating a rotating magnetic-field in said airgap, and a generally cylindrical annular rotor member of electrically-conductive, non-magnetic material extending into said airgap for rotation by said field.

Exemplary embodiments of the invention will now be described for purposes of illustration but not of limitation with reference to the accompanying drawings, wherein:

FIG. 1 is a view of an improved motor in axial section;
FIG. 2 is a view partly in elevational and partly in axial section of a motor generally similar to that shown in FIG. 1, incorporated as part of a textile yarn-twisting device; and FIG. 3 is a section on line III—III of FIG. 2.

As shown in FIG. 1, a high-speed asynchronous motor comprises a stator assembly formed in the generally conventional way by a stack of magnetic laminations 1 and provided with field windings 1a. The stator assembly is housed, as shown, partly in a recess 5b formed in a main housing 4 and partly in a complementary recess 5a formed in an end housing member or cover 4a which in turn is partly received in an end recess 5c of the main housing. Projecting from the housing member 4a is a magnetic core member 2 also formed from magnetic laminations and preferably mounted for free rotation on a tubular stub shaft 6 fitted in housing member 4a.

An annular cylindrical airgap is defined between the peripheral surfaces of the stator lamination 1 and the inner core lamination 2, and into this airgap projects a rotor member 3 in the form of a thin-walled annular cylindrical member made of an electrically-conductive, non-magnetic material, preferably a lightweight metal such as aluminum. As shown, the rotor member 3 is formed as an axial extension from one end of a tubular rotor shaft 8 which projects through the main housing member 4 and constitutes the output shaft of the motor. This shaft 8 is mounted for high-speed rotation in the housing member 4 by means of air bearings, and for this purpose the housing 4 is provided with an internal axial recess including the two oppositely tapered frustoconical portions 11 and 12 extending from either side of an intermediate cylindrical recess of the housing member 4. Conveniently, the main housing member 4 is in two separate sections as shown, for ease of fabrication. The tubular shaft 8 has an external surface which is contoured in longitudinal section to correspond with the biconical recess defined by the tapered bores 11 and 12, while being so dimensioned as to define a uniform annular gap between the external periphery of the shaft 8 and internal periphery of the biconical recess 11—12.

Means are provided for injecting an air stream under pressure into this annular gap. For this purpose the housing 4 has a threaded union 13 for connection with a source of compressed air. The air delivered through union 13 is passed to an annular chamber 14 formed in housing 4 coaxially with the shaft bearing recess, and is thence delivered through the pair of oppositely disposed orifices or nozzles 15, 16 into the ducts 17, 18 formed in the housing 4 and opening into the respective frustoconical bores 11 and 12, thus providing in operation an annular blanket of pressure air around the periphery of shaft 8 for floating the rapidly revolving shaft in its housing recess. Due to the dual taper of the air bearing means thus provided towards the opposite ends of the shaft housing, the air bearing simultaneously acts as a thrust bearing for the shaft and a self-centering effect is provided which maintains the shaft 8 in axially and radially centered relationship within its housing.

The airstream serving to center the shaft in its air bearings is additionally used to cool the motor. Thus, it will be evident that with the construction shown at least part of the air injected into the bearing through the ducts 17, 18, will flow into the gap present between the outer periphery of annular rotor 3 and the inner surface of the stator laminations 1, then will flow around the free end of the annular rotor, through the gap present between the inner rotor surface and central magnetic core 2, and into the axial recess of tubular shaft 8, and/or the axial recess in stub shaft 6 if provided. According to an additional cooling provision, suitable ducts, not shown, may be provided for passing part of the airstream adjacent to the field windings 1a for dissipating the heat generated therein.

In one practical embodiment of the motor illustrated, the field windings were two-phase, and were arranged in 12 winding slots using 46 2 x $^{25}/_{100}$ mm. wires per slot, there being 276 wires in series per phase. The stator and core laminations were made from a grade of magnetic steel known as 2W6, meaning that the total losses in the iron at a 50 c.p.s. frequency and a magnetic field of 10,000 gauss were substantially 2.6 watts per kilogram of metal sheet.

The values of magnetic flux were the following: 4,000 gauss in the airgap; 4,300 gauss in the stator slots, and 4,800 gauss in the central core. The airgap width was 0.7 mm., with a radial clearance of 0.1 mm. between stator and rotor, 0.1 mm. between rotor and central core 2, and 0.5 mm. wall thickness of annular rotor 3.

The motor thus constructed was tested under a phase voltage of 200 volts at a frequency of 3,600 c.p.s. Under these conditions the primary current was 2 amperes and the total in-phase power absorbed was 300 watts (the power factor of the motor was cos $\phi$=0.35), when the rotational speed of the motor was 150,000 r.p.m. as measured stroboscopically.

When the input frequency was reduced to 3000 c.p.s. all other conditions remaining the same, the angular velocity was 140,000 r.p.m.

As regards the characteristics of the air bearing used in the exemplary motor construction described, the air supply pressure was 2 kg./cm.$^2$, and the rate of delivery was 60 liters per minute. The radial clearance between the biconical shaft 8 and the complementary housing recess was 40 microns.

The tubular shaft 8 and its integral annular rotor extension 3 were made of aluminum.

It was found that the steady-state angular velocity of the motor (e.g. 150,000 r.p.m. as mentioned above) was attained within about 5 seconds when starting from the stationary condition.

It is especially emphasized that in the construction shown the entire revolving structure of the motor including shaft 8 and rotor extension 3 can comparatively easily be machined to a very high degree of accuracy so as to ensure quasi-perfect dynamic balancing, especially in view of the very low weight of the shaft and rotor assembly due to their tubular construction and the low-density material e.g. aluminum, from which the assembly is desirably made. Moreover, since according to a basic feature the rotor is completely free from any magnetic parts of the kind present in the rotors of conventional asynchronous motors, said rotor is not exposed to any kind of magnetic attraction from the stator field in the radial (or any other) direction, it being recalled that such magnetic attraction and the resulting disturbing forces was a chief source of speed limitation in conventional asynchronous motors. For the above reasons coupled with the improved air bearing means disclosed, the motors of the invention are able easily to attain the high speeds indicated without necessitating any special precautions to be taken and still retain long service life. These improved motors are of especial advantage in all those many applications where very high-speed, low-load operation is desired.

One important application of this kind which is specifically envisaged by the present invention is in connection with twisting or false-twisting apparatus in the textile industry, as will now be described.

Yarn twisting and false-twisting devices require a spindle to be rotated at very high velocities under low load. Such devices furthermore require to be started into high-speed rotation repeatedly, e.g. every time a fresh bobbin of yarn is substituted for an exhausted one, and whenever a break may occur in the yarn being twisted or false-twisted. Hence, the spindle is required to attain its full operating speed within as short a time as possible from starting, since during the transitional starting period before full velocity has been attained the corresponding length of yarn is unsatisfactorily twisted and may have to be rejected. In view of the high linear feed velocity of the yarn in a high-speed present-day textile plant, e.g. 40 meters per minute or more, it will be appreciated that this can represent a substantial economical loss unless the starting period of the twisting spindle motor is reduced to a strict minimum. The low-inertia, low-loss, high-speed motor of the invention is, therefore, eminently well-suited for this particular application.

Referring to FIGS. 2 and 3, a false-twisting device is there shown which incorporates the motor described above with reference to FIG. 1. The motor portion of the device is shown partly in section similarly to FIG. 1 and partly in elevational outline and parts of it have been numbered with the same references as those used in FIG. 1 whereby a complete description will not be necessary. In this false-twisting device, the tubular shaft 8, which preferably is arranged to extend vertically upwards, is provided at its upper end e.g. beyond the top of the motor housing with a pair of orthogonally disposed, axially spaced internal cross members 21 and 23 (also see FIG. 3), preferably formed with concave depressions intermediate their lengths for the engagement of the yarn as presently described. These cross-members, or the intermediate yarn-engaging portions thereof, should be made or lined with hard wear material and should be polished to an extremely smooth surface condition to avoid any damage to the yarn. In one embodiment, the cross members 21, 23 were made from nickel-chromium alloy steel, hardened and polished to a smooth surface finish. Cross members made from or lined with silica, sintered tungsten carbide and similar high-hardness materials may also be used.

The yarn 10, e.g. nylon yarn to be false-twisted is reeled off from a conventional feed mechanism, not shown, and passed upwards through the recess in tubular, stub-shaft 6, then through tubular motor shaft 8, and is engaged as shown around the central sections of both cross members 21, 22, in such a manner as to be driven in high-speed rotation with the shaft 8 while permitting the yarn to be simultaneously fed upwards at a substantial linear velocity, towards suitable take-up means not shown. In this manner the desired false-twist is imarted to the yarn as is well-known in the textile art. In view of the short period of time (about five seconds or less) in which the shaft of the motor of the invention is able to attain its full operating speed as previously indicated, the lengths of yarn necessarily lost due to unsatisfactory twist each time the device is restarted are relatively very short so that substantial savings of valuable yarn are achieved.

What we claim is:

1. A high-speed low-inertia motor comprising a housing; magnetic structure mounted in said housing and defining a generally cylindrical annular airgap; winding means creating a radial rotating field in said airgap; a tubular shaft made of lightweight electrically-conductive non-magnetic material journalled in a recess of said housing and defining a radial clearance space between the outer surface of said shaft and the inner surface of the recess; a generally cylindrical annular extension projecting from one end of said tubular shaft into said airgap for rotation by said rotating field; and means connected with a source of pressure gas and communicating with said clearance space to discharge said gas thereinto to float the shaft in the recess; said recess communicating with said airgap whereby said gas will issue from said clearance space and flow around said annular extension and into the tubular recess of said shaft and thence to the exterior for cooling the motor.

2. A high-speed low-inertia motor comprising a housing; said housing having a recess including a pair of oppositely-tapered frusto-conical portions; magnetic structure mounted in said housing adjacent an end of the recess and defining an annular airgap; windings creating a rotating radial field in the airgap; a tubular shaft having an outer surface complementary in shape to said recess and journalled therein and defining a radial clearance space between said shaft and recess; an annular rotor member made of electrically-conductive non-magnetic material extending axially from an end of the shaft and into said airgap for rotation by said field; and passage means in said housing connectable with a source of pressure fluid and communicating with each of the frustoconical portions of the recess for injecting said fluid into said clearance space for floatingly retaining said shaft therein both in respect to its transverse and axial position in said recess.

3. An electric motor comprising a body having two opposite end faces, the body having a recess formed in one of said end faces, a closure member secured to said one end face and defining with said recess a generally cylindrical stator chamber, a stud projecting from said closure member within said chamber in coaxial relation therewith, an inner stator element surrounding and carried by said stud, an outer stator element supported in said chamber so as to surround the inner stator element with an annular space therebetween, a longitudinal bore in said body extending coaxially with said stud, a rotor shaft disposed in said bore and provided with a tubular extension of electrically conductive non-magnetic material constituting a rotor adapted to be received and rotated within said annular space, said bore and said shaft having coacting bearing surfaces with a clearance space therebetween, and means for conducting fluid under pressure to said clearance space at two axially spaced points thereof for floatably supporting said shaft out of engagement with said bore.

4. An electric motor comprising an elongated body having two opposite end faces, the body having a recess formed in one of said end faces, a closure member removably secured to said one end face and defining with said recess a generally cylindrical stator chamber, said closure member provided with a central aperture, a tubular stud engaged in said aperture to project within said chamber in coaxial relation therewith, an inner stator element surrounding and carried by said stud, an outer stator element supported in said chamber so as to surround the inner stator element with an annular space therebetween, a continuous bore through said body coaxial with said stud, a rotor shaft of electrically conductive non-magnetic material having a tubular length portion disposed in said bore so as to extend from said recess to the other end face of said body, a cylindrical extension at the inner end of said shaft portion and integral therewith to constitute a rotor adapted to be received and to rotate within said annular space with a gap between itself and said stator elements, said bore forming a plain bearing for said shaft portion and said plain bearing and shaft portion having cooperating bearing surfaces with a clearance space therebetween, said cooperating bearing surfaces having a taper which increases from each end of said bore toward the middle thereof so as to form supporting and running bearings for said shaft portion, and means for conducting fluid under pressure to said clearance space for floatably supporting said shaft out of engagement with said bore.

References Cited in the file of this patent

UNITED STATES PATENTS

| | | |
|---|---|---|
| 1,304,229 | Wiard | May 20, 1919 |
| 1,526,773 | Clough | Feb. 17, 1925 |
| 2,463,619 | Kunzle | Mar. 8, 1949 |
| 2,738,433 | Schroeder et al. | Mar. 13, 1956 |
| 2,822,223 | Offen | Feb. 4, 1958 |
| 2,832,908 | Abbott | Apr. 29, 1958 |
| 2,863,277 | Biollat et al. | Dec. 9, 1958 |
| 2,937,294 | Macks | May 17, 1960 |
| 2,957,302 | Lenk et al. | Oct. 25, 1960 |
| 2,958,035 | Binggeli | Oct. 25, 1960 |

FOREIGN PATENTS

| | | |
|---|---|---|
| 1,079,388 | France | May 19, 1954 |
| 650,950 | Great Britain | Mar. 7, 1951 |
| 726,918 | Great Britain | Mar. 16, 1955 |
| 757,242 | Great Britain | Sept. 19, 1956 |
| 823,582 | Great Britain | Nov. 11, 1959 |